United States Patent [19]

Shigeta et al.

[11] Patent Number: 5,473,535
[45] Date of Patent: Dec. 5, 1995

[54] METHOD AND APPARATUS FOR PREPARING PATTERN DATA FOR MACHINE TOOL

[75] Inventors: Katsunori Shigeta; Haruyuki Nakamura; Noriko Akama, all of Aichi, Japan

[73] Assignee: Mitsubishi Denki Kabushiki Kaisha, Tokyo, Japan

[21] Appl. No.: 181,538

[22] Filed: Jan. 4, 1994

Related U.S. Application Data

[63] Continuation of Ser. No. 666,767, Mar. 8, 1991, abandoned.

[30] Foreign Application Priority Data

Mar. 23, 1990 [JP] Japan ..................................... 2-74709

[51] Int. Cl.⁶ .................................................. G06F 15/46
[52] U.S. Cl. ........................... 364/191; 364/470; 112/454; 112/470.04; 112/475.19
[58] Field of Search ..................... 364/191–193, 364/470; 112/188–190, 121.12, 121.11, 103, 266.1, 262.3, 453–457

[56] References Cited

U.S. PATENT DOCUMENTS

| | | | |
|---|---|---|---|
| 4,190,007 | 2/1980 | Kimura et al. | 112/121.12 |
| 4,429,364 | 1/1984 | Maruyama et al. | 364/191 |
| 4,446,520 | 5/1984 | Shigeta et al. | |
| 4,522,137 | 6/1985 | Takenoya et al. | 112/453 |
| 4,627,003 | 2/1986 | Kishi et al. | 364/191 |
| 4,706,002 | 11/1987 | Fukuyama | 364/192 |
| 5,009,176 | 4/1991 | Shigeta et al. | 112/121.12 |
| 5,124,620 | 6/1992 | Kurebayashi et al. | 364/191 |
| 5,228,402 | 7/1993 | Sugimoto | 112/454 |
| 5,228,403 | 7/1993 | Sugimoto | 112/454 |
| 5,299,519 | 4/1984 | Hirabayashi | 112/456 |

FOREIGN PATENT DOCUMENTS

| | | |
|---|---|---|
| 0076970 | 4/1983 | European Pat. Off. . |
| 0083502 | 7/1983 | European Pat. Off. . |
| 0099733 | 2/1984 | European Pat. Off. . |
| 2729144 | 12/1977 | Germany . |
| 2825826 | 12/1978 | Germany . |
| 2015193 | 9/1979 | United Kingdom . |
| 2208325 | 3/1989 | United Kingdom . |
| 02851 | 12/1980 | WIPO . |

OTHER PUBLICATIONS

Lekikon der Datenverarbeitung, published by Verlag Moderne Industrie, fifth edition, 1972/73, pp. 102–105.

*Primary Examiner*—Roy N. Envall, Jr.
*Assistant Examiner*—Thomas E. Brown
*Attorney, Agent, or Firm*—Sughrue, Mion, Zinn, Macpeak & Seas; Richard C. Turner; Raymond H. J. Powell

[57] ABSTRACT

An information indicating that a pattern machining data for an industrial machine, which data is a collection of sectional machining data each including workpiece feed amount for each sectional machining and machining information for each sectional machining, is made contiguous to another machining data is inserted into a predetermined one of the machining data so that a plurality of machinings whose data size exceeds a capacity of a machining data memory of the machine can be can be performed thereby continuously.

39 Claims, 9 Drawing Sheets

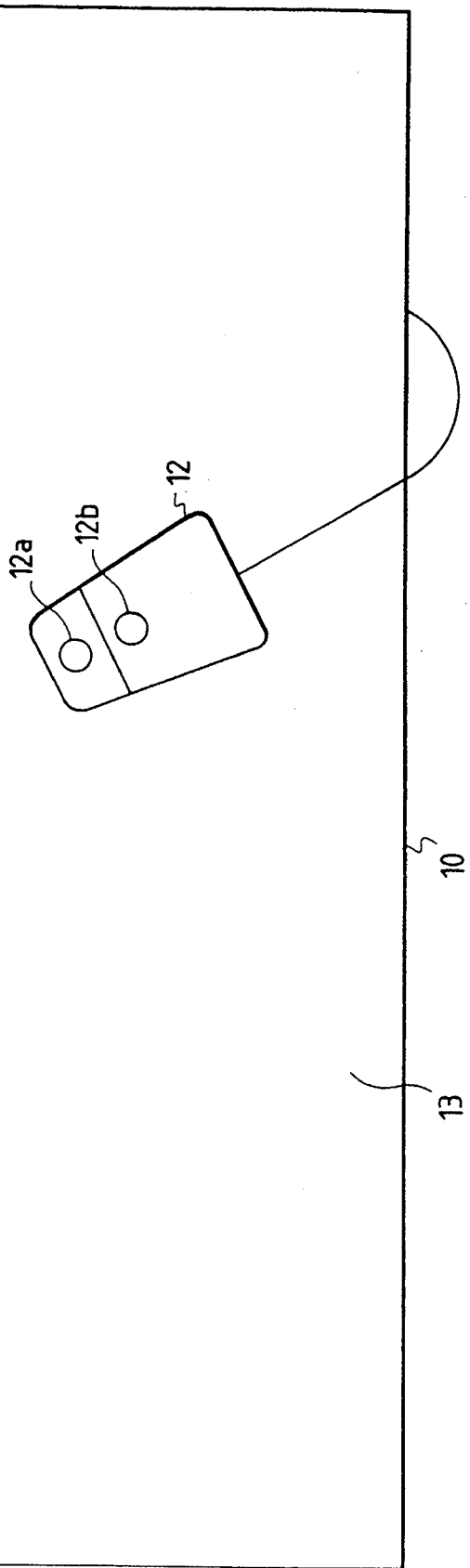

FIG. 3
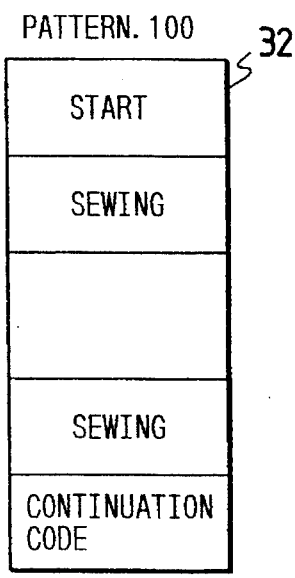
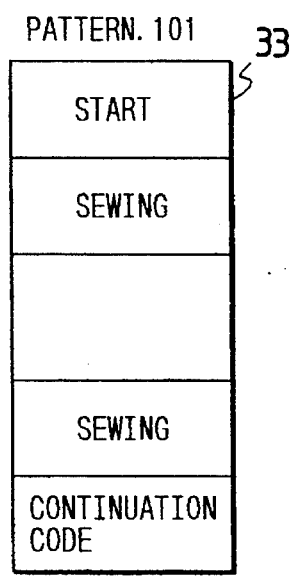
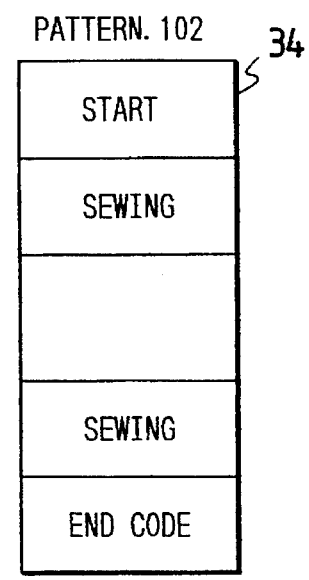
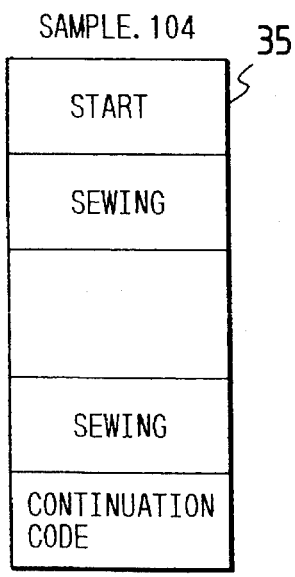
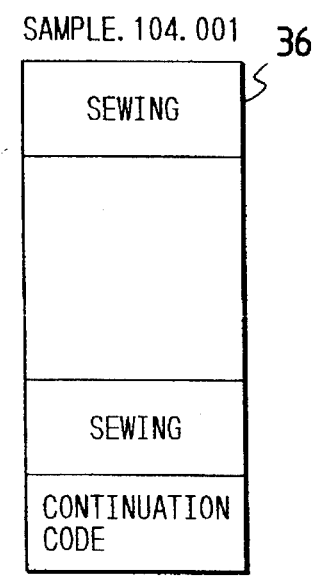
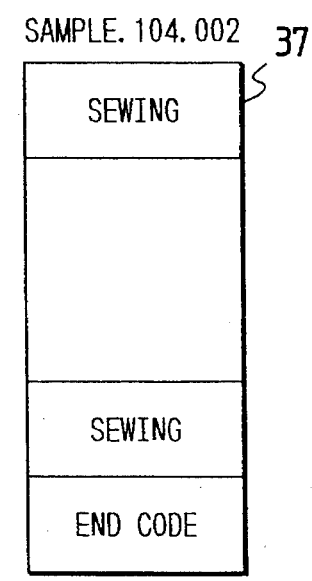

| PATTERN INPUT | START | SCALE | 1 | 2 | 3 | HIGH SPEED | POINT INPUT | | THREAD CUT | RETURN TO START | RESET |
|---|---|---|---|---|---|---|---|---|---|---|---|
| WRITE | W/R START | STITCH LENGTH | 4 | 5 | 6 | MIDDLE SPEED 1 | LINEAR INPUT | 2716 | INTERME-DIATE STOP | END | CLEAR |
| READ | | PATTERN NO. | 7 | 8 | 9 | MIDDLE SPEED 2 | | 2732 | IDLE FEED | SECOND START POINT | |
| | | | 0 | | | LOW SPEED | | 2732A | | | 1st STITCH ELASE |

# METHOD AND APPARATUS FOR PREPARING PATTERN DATA FOR MACHINE TOOL

This is a continuation of application Ser. No. 07/666,767 filed Mar. 8, 1991, abandoned.

BACKGROUND OF THE INVENTION

The present invention relates to a method and apparatus for preparing pattern data for a machine tool which performs a desired work for a workpiece according to a desired pattern.

Among industrial machines, a machine such as sewing machine by which a desired stitch pattern is formed on a cloth automatically by moving the latter along a flat surface while holding the cloth with pressure, according to sewing data preliminarily programmed and stored in a memory device thereof is known. Such sewing data are usually stored in a recording medium in the memory device such that sewing of any of different patterns can be done easily. As the recording medium, semiconductor memory, magnetic card or floppy disc, etc., may be used, in which sewing machine operation information is stored according to the sequence of stitching. Control information for controlling the machine operation includes a control instruction concerning relative positional shift of the cloth to a needle of the sewing machine and a moving rate of the cloth for each stitching and a control instruction for controlling a motor for driving the sewing machine and the needle thereof. Control information for each sewing pattern is formed as a collection of these control instructions for each stitch. Therefore, in order to perform sewing of a desired sewing pattern with this sewing machine, it is necessary to prepare control data corresponding to the desired sewing pattern and store it on the recording medium.

FIG. 7 is a perspective view of an example of a conventional sewing data preparing apparatus which is disclosed in, for example, Japanese Kokai (Patent) No. 60- 148582, FIG. 8 is a plan view of an example of a tablet digitizer thereof and FIG. 9 is an example of a hardware construction thereof. The tablet digitizer 10 (FIG. 8) is provided in front of the apparatus, which includes a menu portion 11 for inputting data and a pattern input portion 13.

In FIG. 7, a cursor 12 is used for selection on the menu portion 11 and acquisition of coordinate data from the pattern input portion 13. The sewing data preparing apparatus includes an LED display panel 20 including various switches and LED's provided on a front panel thereof and a CRT 26 for displaying pattern data, the CRT 26 being equipped with a usual key board 26A including ten keys and alphabetic keys, etc. The apparatus further includes a floppy disc driver 16 for driving a floppy disc 18 (FIG. 9) inserted thereinto as a recording medium to write sewing data into the floppy disc 18 or read it therefrom and a LED display panel 20.

In FIG. 7, the cursor 12 is shown together with an example of the menu portion 11. The cursor 12 includes a readout portion 12a and a switch 12b.

An operation of this sewing data preparing apparatus will be described with reference to FIG. 9. By drawing a desired sewing pattern on the tablet digitizer 10 using the cursor 12, sewing data is produced by control operations to be performed mainly by a CPU 14, which is temporarily stored in a RAM 24. Then, the temporarily stored data is written in the floppy disc 18 by the floppy disc driver 16 and the sewing machine 38 is driven by inserting the floppy disc 18 into the control device 40 as the sewing data recording medium.

In the conventional sewing data preparation apparatus mentioned above, the memory capacity of the apparatus for storing the sewing data depends upon a size of the RAM 24 and it is impossible to prepare sewing data whose size is larger than the capacity of the RAM 24.

SUMMARY OF THE INVENTION

Therefore, an object of the present invention is to provide a method and device for preparing machining data according to which a plurality of machining data a total size of which is beyond a memory capacity of a machine and which are used to perform machining operation of a certain continuous machining pattern can be produced sequentially.

In a machining data preparing apparatus according to the present invention, a plurality of partial pattern data for machining a certain pattern are stored in a memory and the partial pattern data are read out from the memory and connected in series or made contiguous according to codes each indicative of a connection of a partial pattern data to another partial pattern data, to form a whole machining data for such complete pattern.

The apparatus and method of preparing machining data, according to the present invention, employ an information indicative of connection of one machining datum to an adjacent machining datum, the information being inserted into a machining data.

In the present invention, a plurality of pattern data can be processed as a single data.

Although, in this specification, a sewing machine is employed as an example of machine adapted to be used with this invention, it should be understood that the present invention is not limited thereto and is applicable to any other machines such as welding machine, etc., whose machining point is movable with respect to a workpiece.

BRIEF DESCRIPTION OF THE DRAWINGS

FIG. 1 shows a tablet digitizer and a cursor of a sewing data preparing device according to an embodiment of the present invention;

FIG. 3 shows an example of data change resulting from partial pattern assembling;

DETAILED DESCRIPTION OF THE PREFERRED EMBODIMENTS

Figure 2A:
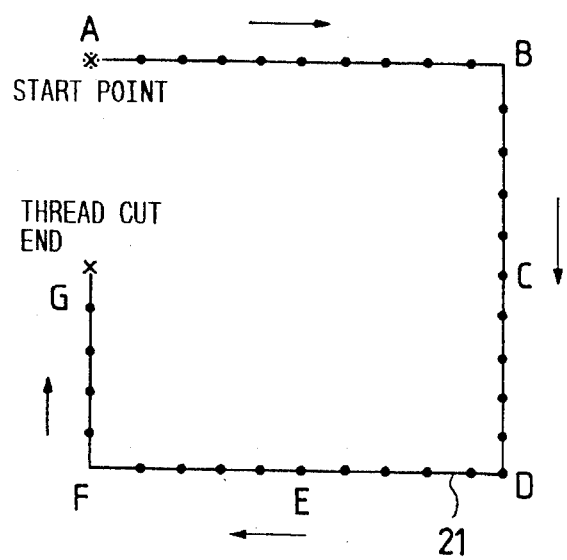
FIG. 2a shows an example of a pattern to be sewed.

An embodiment of the present invention when applied to an industrial sewing machine will be described with reference to the accompanying drawings.

In FIG. 1 which shows a construction of a tablet digitizer and a cursor, the tablet 10 includes a menu portion 11A which has, in addition to a conventional menu portion, a "continuation" option which indicates a continuity of data. The cursor 12 includes a read portion 12a and a switch 12b. A reference numeral 13 depicts a sewing pattern input portion. When the switch 12b is depressed at a certain position of the sewing pattern input portion, the read portion 12a reads data in that position.

Figure 2C:
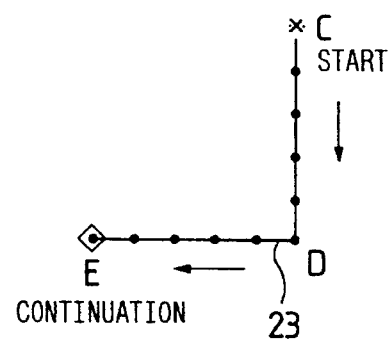
FIGS. 2b, 2c and 2d show elementary patterns constituting the pattern shown in FIG. 2a when made contiguous.
Figure 2B:
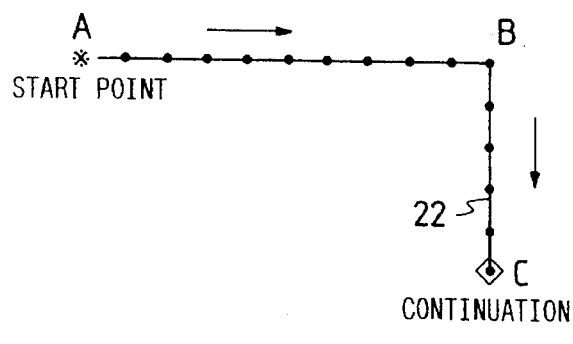
Figure 2D:
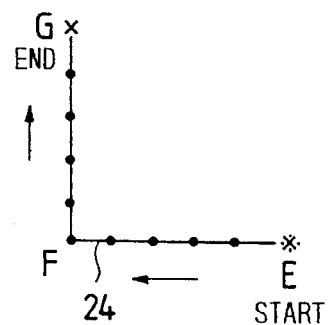
Figure 9:
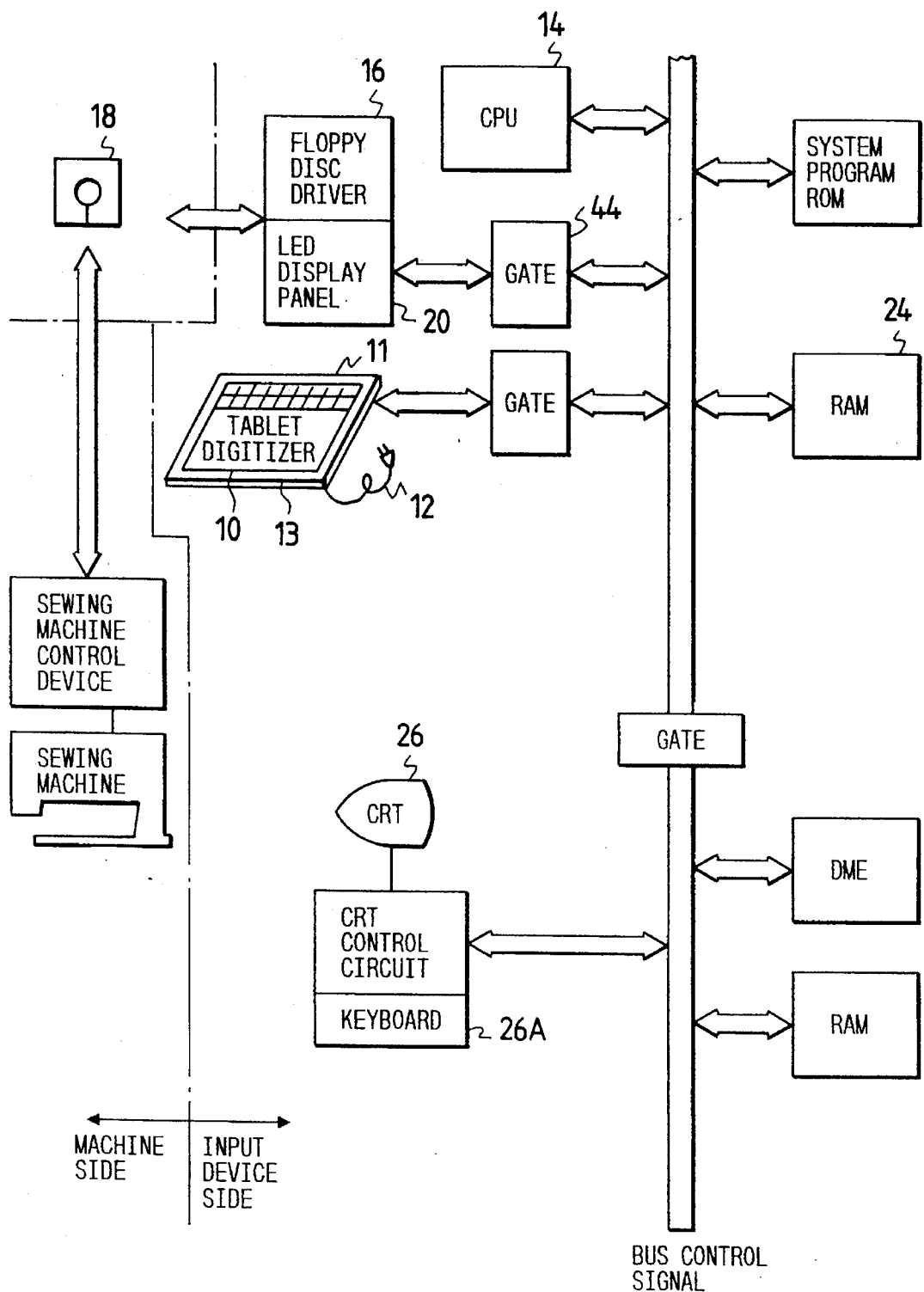
FIG. 9 shows a construction of a conventional sewing data preparing apparatus.

FIG. 2a shows a complete pattern 21 to be sewed by a sewing machine, FIGS. 2b, 2c and 2d show partial patterns constituting the complete pattern 21 in FIG. 2a when connected in series. Although the complete pattern 21 shown in FIG. 2a is a simplified example of a sewing pattern having minimum number of stitches, an actual pattern to be handled according to the present invention should be considered as a large or complicated pattern whose data size may be larger than that of the RAM 24 in FIG. 9. Furthermore, since a construction of hardware is similar to that of the conventional device, details thereof are omitted.

An input method of input of the complete sewing pattern 21 shown in FIG. 2a as three files will be described with reference to FIG. 1. First, a drawing bearing the complete pattern 21 is put on the pattern input portion 13 of the tablet digitizer 10 and then the read portion 12a of the cursor 12 is put on a "pattern input" option of the menu portion 11a. Then, the switch 12b is depressed to make a pattern input ready. Similarly, an input condition setting is performed by sequentially putting the read portion 12a on positions "scale", "1", "0", "0", "stitch length", "3", ".", "0", "high speed", "linear input" and "start" with respective depressions of the switch 12b. In the above example, the scale is set as 100% so that the size of the drawing is made equal to the size of data. Thus, the input method is linear input and a stitch data of 3.0 mm is produced when two points are input. The sewing speed is set high in this example.

Thereafter, the read portion 12a of the cursor 12 is put on a start point A of the pattern 21 and the switch 12b is depressed to input the start position. Subsequently, data of point A to B "linear input", "high speed", point B to C "linear input", "high speed", the point C "continuation code" on the menu portion 11a are input by the cursor 12 in the above order and stored temporally in RAM 24. Thereafter, the data are written to a floppy disc 18. Although, in this example, the sewing data are input a group of as coordinate data of the partial sewing pattern, they can be stored as pattern data constituted with relative values corresponding to a shift amount of a position from a preceding position to a next, depending upon selected sewing conditions. The "continuation code" indicates that one datum is followed by another datum.

In writing, a file name is given to each partial pattern. For a partial pattern 22 in FIG. 2b, "PATTERN 100" 32 is given as its file name (FIG. 3). "The PATTERN" of this file name will be referred to by pattern name and the extension "100" following thereto will be referred to as the pattern number. Data of a partial pattern 23 in FIG. 2c which provides intermediate data when connected is written in by putting the cursor 12 sequentially in point C to D "linear input", "high speed", point D to E "linear input", "high speed", the point E "continuation code". These data are written in the floppy disc 18 in the same way. The partial pattern 23 is given a file name "PATTERN.101" 33 (FIG. 3). A partial pattern 24 in FIG. 2d whose data form a final data when continued has its start point coincident to the final stitch position E of the partial pattern 23 and the data thereof are inputted by putting the cursor 12 sequentially in point E to F "linear input", "high speed", point F to G "linear input", "high speed", point G "thread cut code" and "end code". The data thus obtained are written in the floppy disc 18 similarly. The "end code" is a code notifying the sewing machine of an end of data. The partial pattern 24 is given a file name "PATTERN.102" 34.

Figure 4:
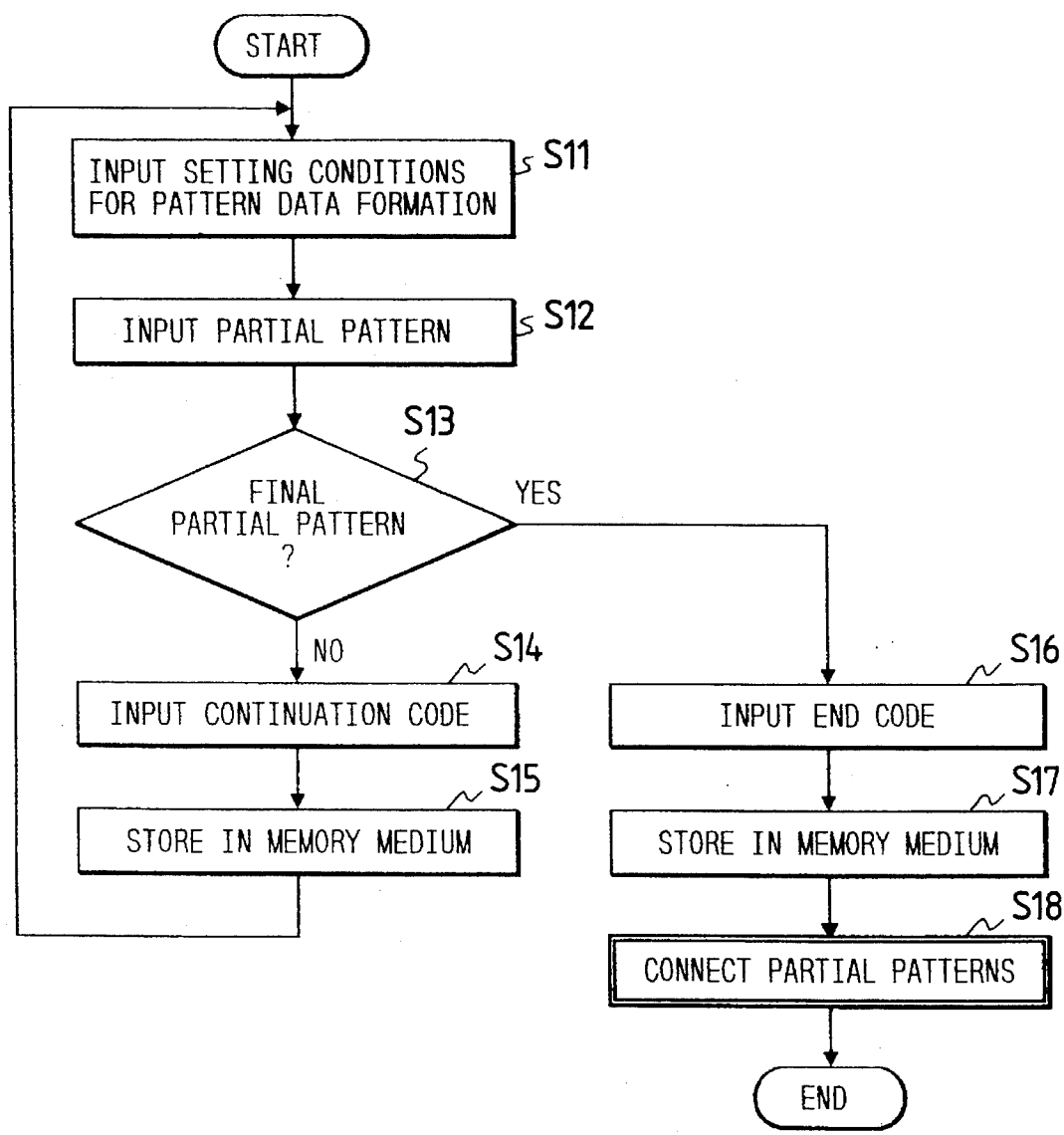
FIGS. 4, 5 and 6 are flowcharts showing an operation of the present invention.

Then, a connecting operation for connecting these data in series is performed for the three files written in the single floppy disc 18 in a manner mentioned below with reference to FIG. 4.

In the step S11, various setting conditions necessary to prepare the sewing data are inputted. Then, data of a partial pattern which forms together with other partial patterns the complete sewing pattern are inputted in the step S12 and it is checked in the step S13 whether or not it is a final partial pattern.

If it is decided in the step S13 that this partial pattern is not a final partial pattern, a connection code is input in the step S14 and stored in an external medium, i.e., the floppy disc 18, in the step S15. This flow is repeated. If the decision in the step S13 indicates that the input partial pattern is a final pattern, an end code is input in the step S16 which is stored in the floppy disc 18 in the step S17.

Thus, in the step S12, it is enough to store, in the memory of the apparatus, partial patterns whose size is within a RAM 24 capacity of the memory and-store other pattern data in the floppy disc 18 which may have larger memory capacity.

Figure 5:
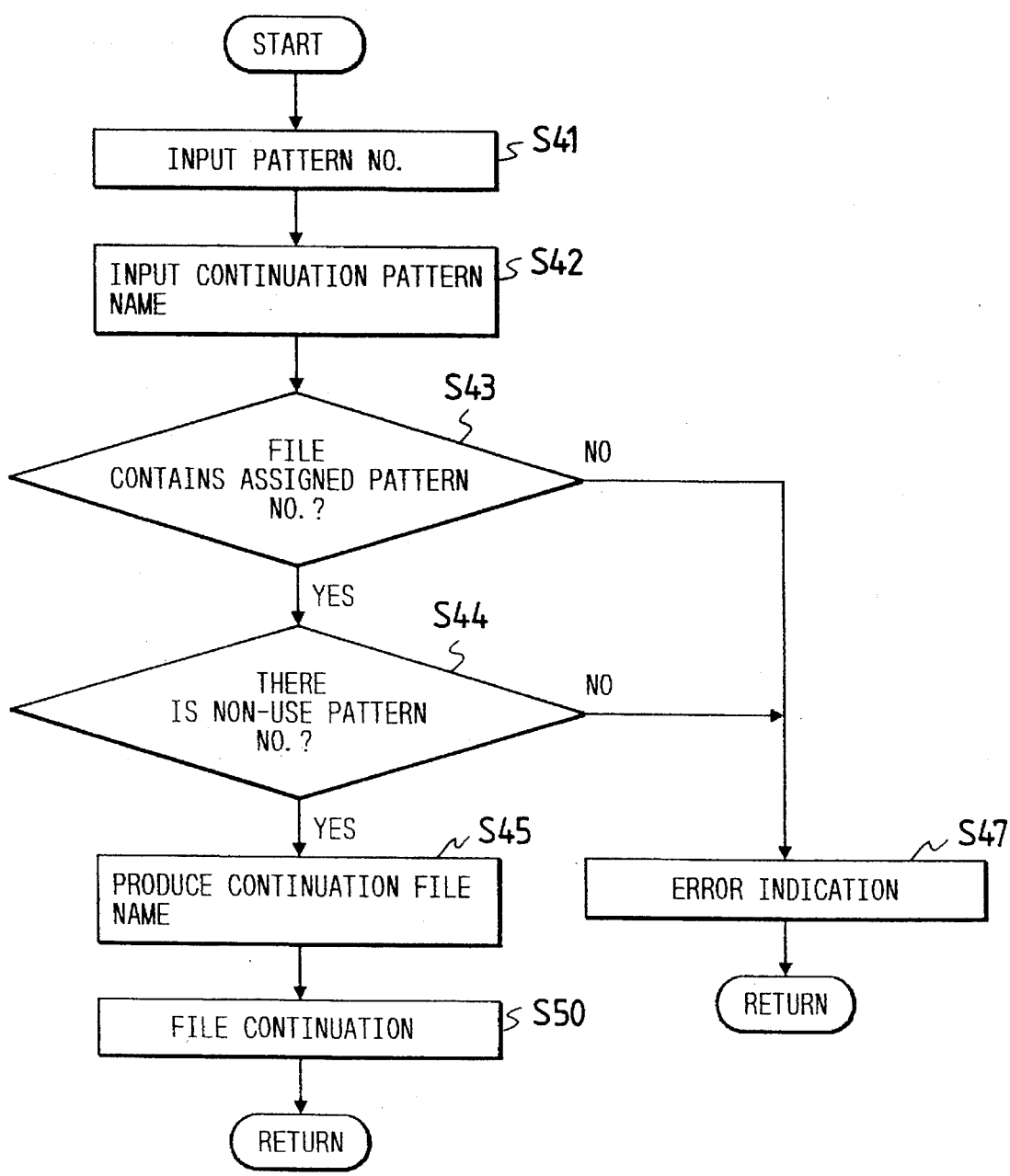

These partial patterns are connected in the step S18. This will be described in detail with reference to FIG. 5. In FIG. 5, the pattern numbers of the three files are inputted, in the step 41, by means of a key board 26a in a desired continuation order. In this case, the order is from 100 to 101 and then to 102. In the step S42, the pattern names of the continuation data to be produced, for example, SAMPLE, is inputted by the key board 26a. In the step S43, it is checked whether or not the pattern number inputted in the step S41 exists and, if absence, an error indication is made on a CRT 26 in the step S47. If exists, the following processing is performed in the step S44.

In the step S44, a pattern number of the continuation data is determined. In this case, a non-used pattern number 104 is automatically allocated thereto. If there is no non-used pattern number, the process is shifted to the step S47 and an error indication is given. The pattern name SAMPLE assigned in the step S42 and the pattern number 104 assigned in the step S44 are added to the file name under which the data corresponding to the "PATTERN.100" 32 in FIG. 3 are stored, resulting in "SAMPLE.104" 35. In the step S45, the continuation file name is produced as to be described below. In order to give a relation between the file name corresponding to "PATTERN.101" 33 in FIG. 3 and a top file name "SAMPLE.104" of the continuation data, the pattern number "104" is made as a pattern name. Since the pattern number is a file which has to be read next to the top data, it is made as "001". That is, the continuation data corresponding to "PATTERN.101" 33 in FIG. 3 is made as "104.001" 36. Similarly, the file name corresponding to "PATTERN.102" 34 in FIG. 3 is produced as "104.002" 37. Finally, the files are made continuous in the step S50.

Figure 6:
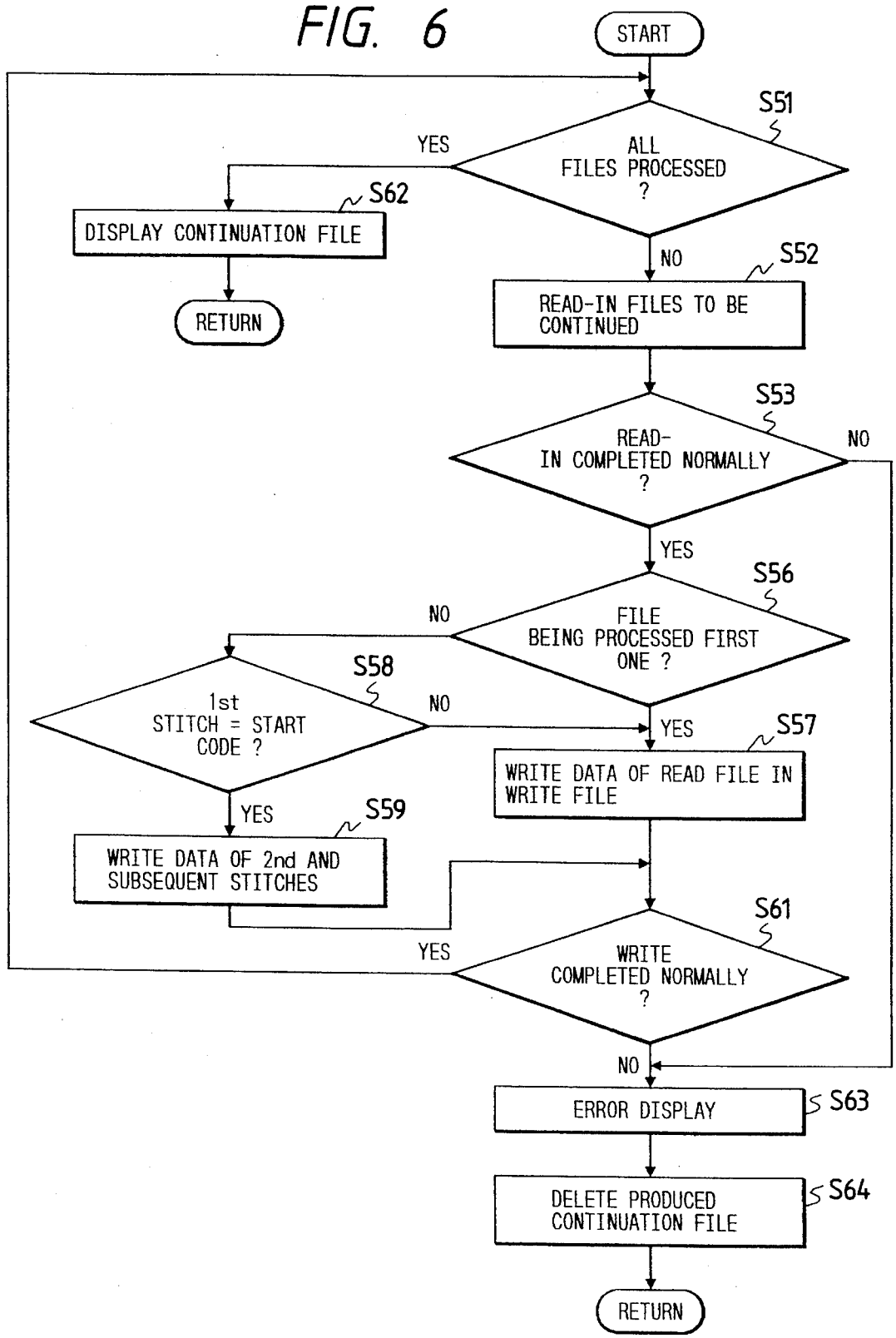
Figure 7:
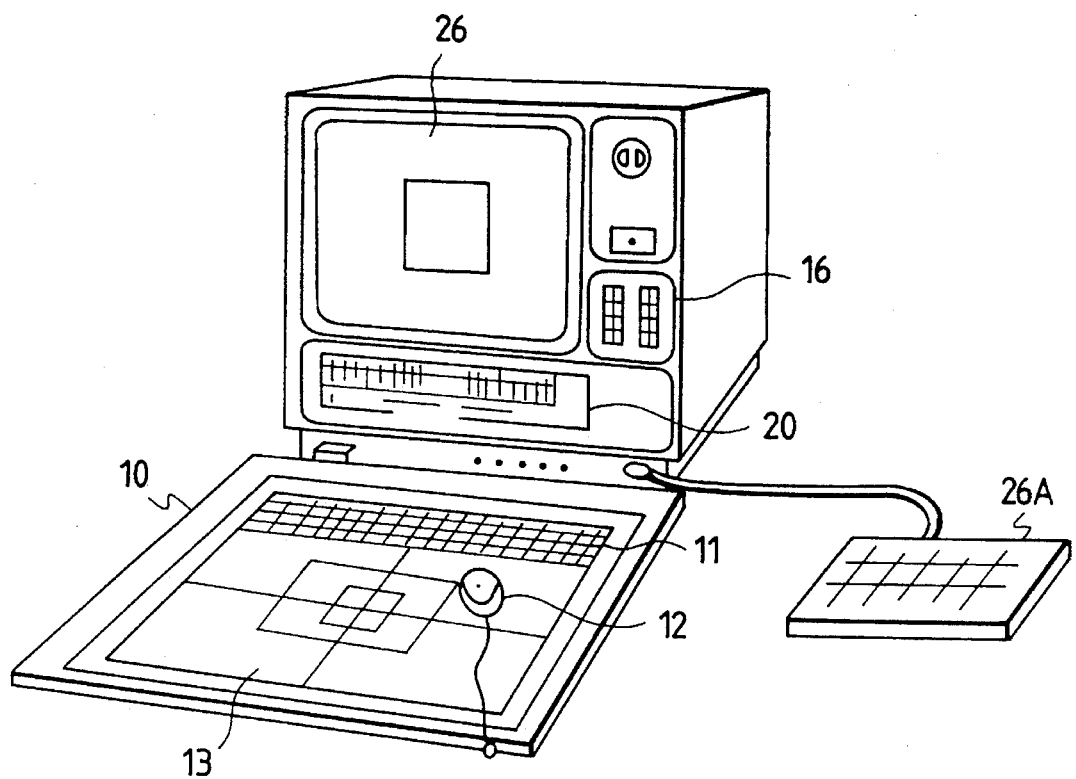
FIG. 7 is a perspective view of a sewing data preparing apparatus of a conventional sewing machine.
Figure 8:
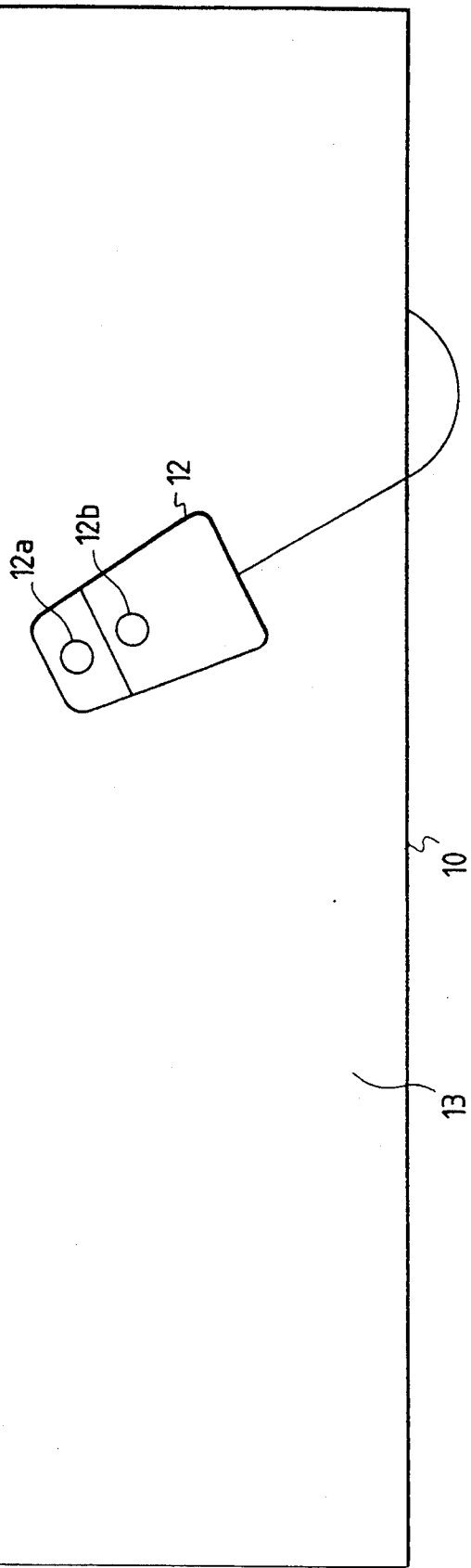
FIG. 8 shows a conventional tablet digitizer and a cursor associated therewith.

The continuation of files to be performed in the step S50 will be described with reference to FIG. 6. In the step S51, it is decided whether processings of all files are completed and if completed the operation is moved to the step S62. If operation is not completed in the step S52, "PATTERN.100" 32 corresponding to the partial pattern 22 is read in. Then, in the step S53, it is decided whether the read-in is completed normally and if completed the operation is moved to the step S56. If not completed, the operation is moved to the step S63 and an error indication is provided on the CRT 26.

In the step S56, it is checked whether the file on process is the first file. If yes, the operation is moved to the step S57 and the data is written in "SAMPLE.104" 35 without correction. Then, in the step S61, it is checked whether or not the writing is completed normally. If not completed normally, an error indication is given in the step S63. If completed normally, "PATTERN.101" 33 is written in the step S52 after the checking in the step S51.

Then, when the checking in the step S53 is yes, it is checked in the step S56 whether the file is the second file. If yes, it is checked in the step S58 whether or not a first stitch is the start code and if yes the first stitch is skipped and data of the second and subsequent stitches are written in "104.001" 36 in the step S59. The writing of the second stitch is to prevent a needle at the start point in FIG. 2c from stitching twice. If not, it is written in the step S57 as it is. "PATTERN.102" 34 is also processed similarly to "PATTERN.101" 33 to produce "104.002" 37. When this processing is completed normally, the continuation file name is displayed on the CRT 26 in the step S62. On the contrary, when the data read/write in this processing is not performed normally, the continuation file produced in the step S64 is deleted. In this case, all of the original files, "PATTERN.100" 32, "PATTERN.101" 33 and "PATTERN.102" 34 are saved and thus these original files and the continuation file are saved in the floppy disc 18.

Although in the described embodiment the three files are made contiguous, the number of files to be connected is not limited thereto. For example, any number of files can be made contiguous theoretically by modifying pattern number input and exchanging floppy discs.

In the continuation processing, pattern data such as various informations in the sewing data are constituted with relative values corresponding to an amount of shift from a preceding position, rather than absolute values such as coordinate values. Therefore, the memory capacity for storing the contents of the respective partial pattern data may be small since it is enough to delete the start data, that is, no operation of coordinate values is necessary. In other words, in the described example, since the continuation processing includes giving file names to the files of the assigned partial patterns according to a desired continuation scheme and writing them as a different file, the continuation relation can be determined by only the file name. Further, in order to provide means for obtaining a timing of a next file name writing in performing a sewing by the sewing machine, a continuation code may be used.

An operation of a sewing machine which is instructed to perform a sewing of a pattern No. 104 prepared in the described manner will be described as an example of the above scheme:

(1) read-in of SAMPLE. 104 in an execution memory.

(2) sewing operation according to data stored in the execution memory.

(3) pick-up of a continuation code in the data.

(4) Read-in of a data 104.001 next to SAMPLE. 104 in the execution memory according to the continuation scheme.

(5) repetition of (1) to (4).

(6) read-in of a data 104.002 next to 104.001 in the execution memory.

(7) sewing operation according to the data stored in the execution memory.

(8) termination of one pattern by an end code.

Although the data preparing apparatus and data preparing method have been described for sewing data for use in a sewing machine, the present invention is not limited to such application. For example, the present invention is also applicable to preparation of drawings. Further, data to be processed may be machining data.

Furthermore, since the original files are saved, not only different files but one and same file can be made contiguous.

Furthermore, since, in FIG. 3, the files 104.001 and 104.002 can not function as independent files, it is preferable to attach an identification codes to the respective files to make them not possible to be called independently.

As described, according to the present invention, it becomes possible to produce a sewing data whose size is selected regardless of the size of memory provided in the sewing data producing device of an industrial machine capable of machining a workpiece along a desired pattern, Although the present invention has been described with reference to an industrial sewing machine, it will be evident to those skilled in the art that the present invention is easily applied to other machines including a welding machine.

What is claimed is:

1. A machining data preparing apparatus for an industrial machine of the type which machines a continuous machining pattern on a workpiece, comprising:

input means for inputting multiple groups of partial coordinate data, each group representing a partial machining pattern corresponding to a segment of said continuous machining pattern;

memory means for storing each of said groups of partial coordinate data and a corresponding identification code as a machining pattern data set for one of said partial machining patterns, wherein a capacity of said memory means is substantially equal to a size of said machining pattern data set;

pattern data input/output means for transferring each of said machining pattern data sets from said memory means to a storing medium and for selectively deriving at least one of said machining pattern data sets from said storing medium according to said identification codes; and operation means for assembling a plurality of said pattern data sets derived selectively from said storing medium, through said pattern data input/output means, according to connection codes, each of which instructs a connection between one of said machining pattern data sets and another machining pattern data set, to produce said continuous machining pattern from said partial machining patterns.

2. The machining data preparing apparatus claimed in claim 1, wherein said machine comprises a welding machine.

3. The machining data preparing apparatus claimed in claim 1, wherein said machine comprises a sewing machine.

4. The machining data preparing apparatus claimed in claim 1, wherein said machine comprises a pattern drawing machine.

5. The machining data preparing apparatus claimed in claim 3, wherein said sewing data for said sewing pattern is stitching data of the sewing machine.

6. The machining data preparing apparatus claimed in claim 1, wherein said connection codes are set in said input means based on continuation data entered by a user for each corresponding partial machining pattern.

7. The machining data preparing apparatus claimed in claim 1, wherein said identification codes are inputted by said input means and attached to said respective partial machining pattern data sets.

8. The machining data preparing apparatus claimed in claim 1, further comprising conversion means for converting said identification codes of said partial machining pattern data sets connected by said operation means into other identification codes.

9. The machining data preparing apparatus claimed in claim 1, wherein said connection codes are set for said partial machining pattern data sets stored in said memory means.

10. The machining data preparing apparatus claimed in claim 1, wherein position codes each indicating a position at which a connection between partial machining pattern data sets is to be made are set in said partial machining pattern data sets to be connected according to said connection codes.

11. A data preparing device for an industrial machine including an execution memory of a predetermined maximum data size, comprising:

means for producing machining data including a plurality of sectional machining data sets, each of said sectional machining data sets having less than said predetermined maximum data size and including a workpiece feed amount and machining information for a corresponding machining section which represents a segment of a continuous machining pattern whose continuous data set is larger than said maximum data size;

means for separately storing each of said sectional machining data sets with a corresponding identification code in memory;

means for selectively reading said sectional machining data sets from said memory by using said identification codes as keys;

means for inputting said identification codes for said plurality of said sectional machining data sets;

means for indicating a connection of said plurality of said sectional machining data sets inputted with said identification codes; and means for connecting in response to said identification codes corresponding sectional machining data sets.

12. The machining data preparing apparatus claimed in claim 11, wherein said industrial machine comprises a welding machine.

13. The machining data preparing apparatus claimed in claim 11, wherein said industrial machine comprises a pattern drawing machine.

14. The machining data preparing apparatus claimed in claim 11, wherein said industrial machine comprises a sewing machine.

15. The machining data preparing apparatus claimed in claim 14, wherein said indicating means are set in said generated sewing data.

16. A sewing data preparing apparatus for generating a complete sewing pattern for a sewing machine having an execution memory of a predetermined maximum size from sewing data including a plurality of stitch data commands, each of which includes a feed amount and sewing information for each stitch of a sewing machine, comprising:

means for inputting groups of said stitch data patterns, representing portions of a continuous sewing pattern, wherein each of said portions is less than said predetermined maximum size and wherein all of said portions combined total more than said maximum size; and means for inputting sewing information indicative of a connection between first and second groups of stitch data commands of said sewing data.

17. A method of preparing sewing data for an electronic sewing machine including an execution memory of a predetermined maximum size, said sewing data being formed from a plurality of stitch data commands each including a cloth feed amount for each stitch and sewing information for each stitch, comprising the step of:

inputting sewing data for multiple groups of stitch data commands, each group representing a portion of a continuous sewing pattern, each said portion being less than said predetermined maximum size but collectively being larger than said predetermined maximum size; and inserting, into a predetermined one of said groups of stitch data commands, information indicating that one of said groups of sewing data commands is contiguous with another one of said groups of sewing data commands.

18. The method claimed in claim 17, wherein said sewing information includes an information indicative of a connection between one and another of said sewing data and an information indicative of a position at which said connection of said sewing data occurs.

19. A sewing data preparing apparatus, according to claim 16, further comprising:

means for separately storing each of said groups of stitch data patterns in memory;

means for attaching identification codes to corresponding groups of stitch data commands; and means for selectively reading said groups of stitch data commands based on said corresponding identification codes and rewriting the selected groups of stitch data commands to a recording medium.

20. A method of preparing sewing data, according to claim 17, further comprising the steps of:

separately storing each of said groups of stitch data patterns in memory;

attaching identification codes to corresponding groups of stitch data commands; and selectively reading said groups of stitch data commands based on said corresponding identification codes and rewriting the selected groups of stitch data commands to a recording medium.

21. A sewing data preparing apparatus, according to claim 16, further comprising:

means for entering a continuation command indicating that a group of stitch data commands previously entered does not represent a final group of stitch data commands in said continuous sewing pattern.

22. A method of preparing sewing data, according to claim 17, further comprising the steps of:

entering a continuation command indicating that a group of stitch data commands previously entered does not represent a final group of stitch data commands in said continuous sewing pattern.

23. A sewing data preparing apparatus, according to claim 21, further comprising means for combining said continuation code and a corresponding group of stitch data commands and storing said combined code and stitch data commands in memory, wherein said group of stitch data commands and said corresponding continuation code are stored immediately after said continuation code is entered and before said continuous sewing pattern is entered.

24. A method of preparing sewing data, according to claim 22, further comprising the step of:

combining said continuation code and a corresponding group of stitch data commands and storing said combined code and stitch data commands in memory, wherein said group of stitch data commands and said corresponding continuation code are stored immediately after said continuation code is entered and before said continuous sewing pattern is entered.

25. The machining data preparing apparatus claimed in claim 2, wherein said connection codes are set in said input means based on continuation data entered by a user for each corresponding partial machining pattern.

26. The machining data preparing apparatus claimed in claim 2, wherein said identification codes are inputted by said input means and attached to said respective partial machining pattern data sets.

27. The machining data preparing apparatus claimed in claim 2, further comprising conversion means for converting said identification codes of said partial machining pattern data sets connected by said operation means into other identification codes.

28. The machining data preparing apparatus claimed in claim 2, wherein said connection codes are set for said partial machining pattern data sets stored in said memory means.

29. The machining data preparing apparatus claimed in claim 2, wherein position codes each indicating a position at which a connection between partial machining pattern data sets is to be made are set in said partial machining pattern data sets to be connected according to said connection codes.

30. The machining data preparing apparatus claimed in claim 3, wherein said connection codes are set in said input means based on continuation data entered by a user for each corresponding partial machining pattern.

31. The machining data preparing apparatus claimed in claim 3, wherein said identification codes are inputted by said input means and attached to said respective partial machining pattern data sets.

32. The machining data preparing apparatus claimed in claim 3, further comprising conversion means for converting said identification codes of said partial machining pattern data sets connected by said operation means into other identification codes.

33. The machining data preparing apparatus claimed in claim 3, wherein said connection codes are set for said partial machining pattern data sets stored in said memory means.

34. The machining data preparing apparatus claimed in claim 3, wherein position codes each indicating a position at which a connection between partial machining pattern data sets is to be made are set in said partial machining pattern data sets to be connected according to said connection codes.

35. The machining data preparing apparatus claimed in claim 4, wherein said connection codes are set in said input means based on continuation data entered by a user for each corresponding partial machining pattern.

36. The machining data preparing apparatus claimed in claim 4, wherein said identification codes are inputted by said input means and attached to said respective partial machining pattern data sets.

37. The machining data preparing apparatus claimed in claim 4, further comprising conversion means for converting said identification codes of said partial machining pattern data sets connected by said operation means into other identification codes.

38. The machining data preparing apparatus claimed in claim 4, wherein said connection codes are set for said partial machining pattern data sets stored in said memory means.

39. The machining data preparing apparatus claimed in claim 4, wherein position codes each indicating a position at which a connection between partial machining pattern data sets is to be made are set in said partial machining pattern data sets to be connected according to said connection codes.

* * * * *